United States Patent [19]

Yamaji

[11] Patent Number: 5,070,812
[45] Date of Patent: Dec. 10, 1991

[54] ELECTROSTATIC LATENT IMAGE DEVELOPING APPARATUS

[75] Inventor: Masaaki Yamaji, Tokyo, Japan

[73] Assignee: Canon Kabushiki Kaisha, Tokyo, Japan

[21] Appl. No.: 631,051

[22] Filed: May 29, 1990

[30] Foreign Application Priority Data

May 31, 1989 [JP] Japan .................................. 1-138957

[51] Int. Cl.⁵ .............................................. G03G 15/09
[52] U.S. Cl. ....................................... 118/658; 355/251
[58] Field of Search ........................ 355/245, 251, 253; 118/658, 656, 657; 430/111

[56] References Cited

U.S. PATENT DOCUMENTS

| | | | |
|---|---|---|---|
| 4,504,136 | 3/1985 | Yoshikawa et al. | 118/658 X |
| 4,653,427 | 3/1987 | Hosaka et al. | 118/658 |
| 4,841,332 | 6/1989 | Haneda et al. | 355/251 |
| 4,844,008 | 7/1989 | Sakemi et al. | 118/658 |
| 4,887,131 | 12/1989 | Kinoshita et al. | 355/253 |

Primary Examiner—R. L. Moses
Assistant Examiner—Sandra L. Hoffman
Attorney, Agent, or Firm—Fitzpatrick, Cella, Harper & Scinto

[57] ABSTRACT

A developing apparatus for developing an electrostatic latent image formed on an image bearing member includes a developer chamber containing a developer comprising non-magnetic toner particles and magnetic carrier particles; a rotatable cylindrical developer carrying member, faced to the image bearing member, for carrying the developer supplied thereto in the developer chamber to supply it to the image bearing member; a magnet stationarily disposed in the developer carrying member to form a magnetic brush of the developer contactable to the image bearing member, wherein a position of maximum magnetic flux density in a direction normal to a surface of the developer carrying member provided by a developing magnetic pole of the magnet is not less than 3 degrees away from a position where the developer carrying member is closest to the image bearing member, and wherein a position of a peak of magnetic force in a direction normal to the surface of the developer carrying member provided by the developing magnetic pole is within 8 degrees from the closest position.

7 Claims, 6 Drawing Sheets

ELECTROSTATIC LATENT IMAGE DEVELOPING APPARATUS

FIELD OF THE INVENTION AND RELATED ART

The present invention relates to a developing apparatus, more particularly to a developing apparatus usable with an image forming apparatus such as an electrophotographic copying machine or an electrostatic recording machine.

A magnetic brush type developing apparatus using two component developer is widely known to be used with an image forming apparatus such as an electrophotographic copying machine or an electrostatic recording machine.

The magnetic brush type developing apparatus includes a non-magnetic cylinder (sleeve) rotatably mounted in a developer container and a stationary magnet roller having a plurality of magnetic poles and disposed in the sleeve. The developer is carried on the sleeve which is rotatable. In one of the known developing apparatuses one of the magnetic pole (developing magnetic pole) is disposed in a developing zone wherein the developer is supplied to an image bearing member. The magnetic brush of the developer formed by the developing pole is contacted to the image bearing member. Also known in an apparatus wherein an alternating electric field is formed in the developing zone to impart to the developer vibrating motion in the latent image developing action to improve the quality of the image. By doing so, the quality of the image is improved, and the reproducibility of the halftone image is improved. Recently, in order to meet the demand for the high quality image, it has been proposed that the size of the toner particles is reduced to provide high resolution and fine images. However, since simply by reducing the size of the particles of the toner, the toner supply power decreases, and therefore, it has also been proposed that the size of the carrier particles are decreased.

In the prior art, however, the reduction of the sizes of the carrier particles results in that the carrier particles are deposited on the image bearing member, and therefore, that the image quality if degraded.

In addition, the fineness is not sufficient, and particularly the half tone reproduced image may be poor with roughness.

SUMMARY OF THE INVENTION

Accordingly, it is a principal object of the present invention to provide a developing apparatus wherein the carrier particles forming the magnetic brush are prevented from being deposited on the image bearing member.

It is another object of the present invention to provide a developing apparatus capable of forming a developed image with sufficient fineness.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
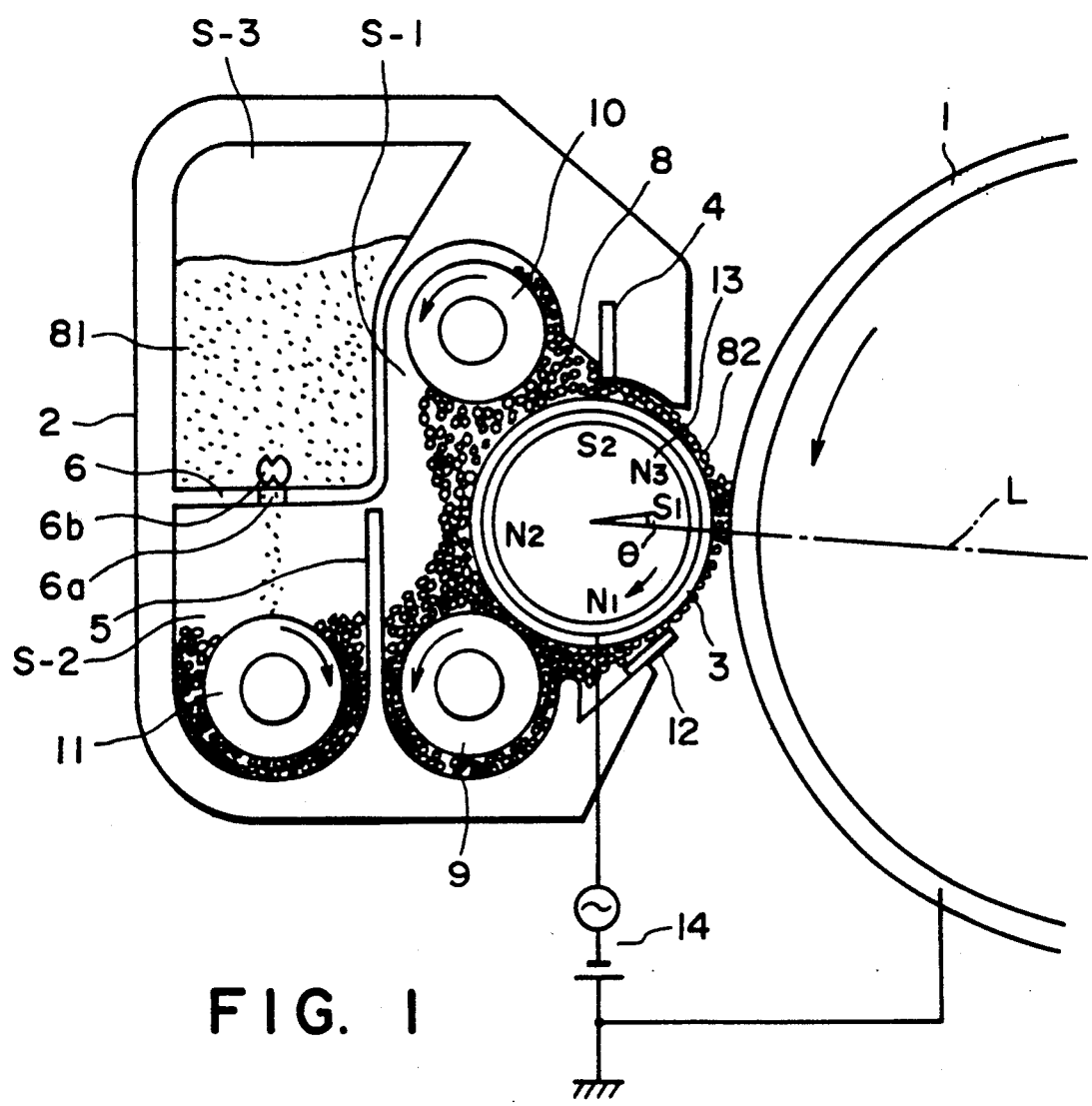
FIG. 1 is a sectional view of a developing apparatus according to an embodiment of the present invention, which is used with a copying machine having a drum type photosensitive member.

FIG. 1 is a sectional view of a developing apparatus according to a first embodiment of the present invention. The developing apparatus is used with a copying machine having an electrophotographic photosensitive member in the form of a drum. Although not shown in the Figure, around the photosensitive drum 1 rotating in the direction indicated by an arrow, there are disposed known electrophotographic process means such as charging means, image exposure means, image transfer means, cleaning means or discharging means.

The developing apparatus comprises a developer container 2 for containing a developer, a cylindrical developing sleeve 3 functioning as a developer carrying member and a blade 4 functioning as a developer layer regulating member. The developer container 2 has an opening, through which a developing sleeve 3 is disposed. Above the developing sleeve 3, the blade 4 is disposed with a predetermined gap from the sleeve 3.

The developing sleeve 3 is made of nonmagnetic material and is rotated in the direction indicated by an arrow during the developing action to carry the developer supplied thereonto in the developer container. In the sleeve 3, a magnet 13 is provided stationarily. The magnet 13 has a developing magnetic pole S1 functioning to form a magnetic field to form a magnetic brush of the developer contactable to the drum 1 on the surface of the sleeve 3 in the developing zone where the developer is supplied from the sleeve to the drum to develop the latent image. It also has magnetic poles N1, N2, S2 and N3 for carrying the developer 8.

In FIG. 1, a line L is a straight line connecting the center of the developing sleeve 3 and the center of the image bearing member 1 On this line, the developing sleeve 3 and the image bearing member 1 are closest, and it is substantially a center of the developing zone.

An angle $\theta$ is formed between the line L and the center of the developing magnetic pole as seen from the center of the developing sleeve. The angle $\theta$ is positive when the center of the developing pole is upstream of the line L relative to the movement direction of the developing sleeve and is negative when it is at the downstream side. Therefore, the pole position or the developing magnetic pole center can be represented by the angle $\theta$.

In this specification, the center of the magnetic pole means a position where the magnetic flux density of the magnetic pole in the direction normal to the surface of the sleeve is maximum.

The blade 4 is made of non-magnetic material such as aluminum or stainless steel (SUS 316, for example). The blade 4 is disposed to the surface of the developing sleeve 3 with a predetermined gap. The gap is effective to regulate a layer of the developer 8 on the developing sleeve 3, that is, the amount of the developer 8 to be conveyed to the developing zone on the developing sleeve 3. Therefore, in this embodiment, the developer containing the non-magnetic toner and the magnetic particles is passed through the gap, that is, between the tip end of the blade 4 and the surface of the developing sleeve 3 and is supplied to the developing zone. The layer of the developer regulated by the blade 4 has such a thickness that the magnetic brush formed thereby in the developing zone is long enough to contact the drum 1.

In the present invention, the developer layer is preferably a thin layer. Therefore, it is preferable that the gap between the blade 4 and the sleeve 3 is 50-900 microns. If the gap is smaller than 50 microns, the developer tends to be clogged in the gap with the result of non-uniformity of the developer layer thickness. If, on the other hand, the gap is larger than 900 microns, the amount of the developer carried to the developing zone is too large. In the case where the alternating electric field is formed in the developing zone, the amount of the carrier particles deposited to the drum 3, and therefore, taken out of the developing apparatus is increased, and therefore, the image quality is deteriorated.

The developer 8 in this embodiment is a two component developer containing non-magnetic toner particles 81 and magnetic carrier particles 82. For the purpose of providing high definition images, the non-magnetic toner particles 81 has a volume average particle size of not less than 4 microns and not more than 10 microns. The volume average particle size may be measured using an aperture of 100 microns, for example and Coalter Counter TA-II (available from Coalter Corporation). The counter is connected with an interface available from Nikkaki Kabushiki Kaisha, Japan outputting a number average distribution and a volume average distribution and CX-i personal computer (available from Canon Kabushiki Kaisha, Japan). As for electrolyte, a first class natrium chloride is used, and 1% NaCl water solution is prepared. In 100-150 ml of the above water solution, 0.1-5 ml of surface active agent (dispersant) preferably alkylbenzenesulfonate is added, in addition, 0.5-50 mg of the material to be measured is added.

The material suspending electrolyte is subjected to a dispersion process by an ultrasonic dispersing device for approximately 1-3 min. Then, the particle size distribution of the particles having the particle sizes of 2-40 microns is measured using the above-mentioned counter TA-II, and the aperture of 100 microns, and from this, a volume average distribution is obtained.

Further, the volume average particle size is obtained from the volume average distribution.

The magnetic particles 82 have a weight average particle size of 30-8 microns, more particularly 40-70 microns and have the resistivity of not less than $10^7$ ohm.cm, preferably not less than $10^8$ ohm.cm. The resistivity can be provided by coating ferrite particles (maximum magnetization of 60 emu/g) with extremely thin resin. The magnetic permeability of the magnetic particles is approximately 5.0.

The resistivity of the magnetic particles can be measured using sandwich type cell having a measuring electrode area of 4 cm$^2$ and a clearance of 0.4 cm between electrodes. To one of the electrodes, 1 kg weight is applied, while a voltage E (V/cm) is applied across the electrodes. The resistivity of the magnetic particles can be obtained from the current flowing through the circuit. The developer 8 is carried to the developing zone, and after passage thereof through the developing zone, it is conveyed to the conveying magnetic pole N1 while being carried on the sleeve 3.

Designated by a reference numeral 12 is a brush rectifier to prevent scattering of the developer and retraction thereof toward upstream. An end thereof is a free end, and the other end is fixed to the developer container 2. A part of the free end is contacted to the developer at a position of the conveying magnetic pole N1 or upstream thereof. The developer 8 having passed through the developing zone is conveyed to the conveying magnetic pole N1 while being carried on the sleeve 3. Here, the member 12 prevents the scattering of the developer when the magnetic brush is formed by the conveying magnetic pole N1 to prevent the developing magnetic pole from being pulled back toward the magnetic pole S1. The conveying magnetic pole N1 and the magnetic pole N2 have the same polarity so that a repelling magnetic field is formed therebetween. Therefore, the developer conveyed to the conveying magnetic pole N1 on the sleeve 3 is removed from the sleeve 3 by the repelling magnetic poles. The removed developer is stirred and mixed by a first conveying means 9 which will be described hereinafter. The sleeve 3 is supplied with new developer adjacent the magnetic pole N2.

The developer having the development hysteresis on the sleeve 3 is removed from the sleeve 3 by the repelling magnetic field, and new developer which has been sufficiently mixed is at all times supplied to the sleeve 3, and therefore, a stabilized and good image can be provided.

The inside of the developer container 2 is partitioned by a partition wall 3 extending in a direction perpendicular to the sheet of the drawing of FIG. 1 into a developing chamber (first chamber) S-1 and a stirring chamber (second chamber) S-2. Above the stirring chamber S-2, a toner containing chamber S-3 is formed with a partition 6. In the toner containing chamber S-3, a supply of toner (non-magnetic toner) 81 is accommodated. In the partition wall 6, a supply port 6a is formed through which an amount of the supply toner 81 corresponding to the consumption of the toner is supplied by a roller 6b into the stirring chamber S-2 by the gravity. In the developing chamber S-1 and the stirring chamber S-2, the two component developer 8 comprising the toner and the carrier particles mixed is accommodated. Adjacent the front and rear end portions of the developer container 2 in FIG. 1, openings (not shown) are formed to permit communication between the developing chamber S-1 and the stirring chamber S-2.

In the developer chamber S-1, there are provided first conveying means 9 and second conveying means 10. The first conveying means 9 is disposed adjacent the bottom of the developer container 2 adjacent the developing sleeve 3 an is rotated in the direction of an arrow to convey the developer 8 from the rear side toward the front side in FIG. 1. The second conveying means 10 conveys the developer from the front side toward the rear side in FIG. 1. In the stirring chamber S-2, a third conveying means 11 is disposed which is substantially at the same horizontal level as the first conveying means 9 and which rotates in the direction of an arrow to convey the developer 8 from the front side to the rear side in FIG. 1. The first, second and third conveying means 9, 10 and 11 are in the form of spiral screws.

The developing sleeve 3 is supplied from the voltage source 14 with such an alternating bias voltage that the light portion potential and the dark portion potential of the latent image are between top and bottom peaks of the alternating voltage. The alternating bias voltage may preferably be superposed with a DC voltage having a level between the light portion potential and the dark portion potential. By the application of the alternating bias voltage, an alternating electric field having alternately changing directions with short period is formed in the developing zone. By this, the toner and carrier particles are vibrated, by which the release of the toner particles from the carrier particles and the surface of the sleeve is promoted, so that the development efficiency is increased.

With the increased developing efficiency, the state of erection of the magnetic brush of the developer is relatively directly reflected in the image quality, and in addition, the end portions of the magnetic brush contacted to the drum in the developing zone tend to be torn, and therefore, the carrier particles tend to be deposited and retained on the drum. The present invention is intended to avoid these problems.

Figure 2:
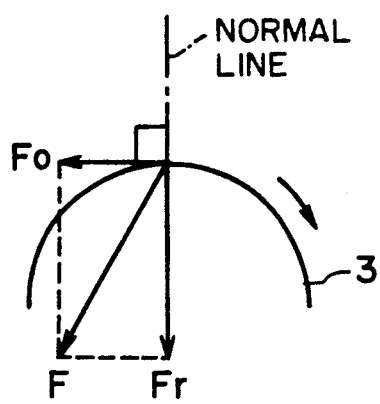
FIG. 2 is a cross-sectional view of a developing sleeve illustrating magnetic force.

FIG. 2 shows the magnetic force Fr on the developing sleeve 3, wherein F is the magnetic force on the developing sleeve; Fr is the magnetic force on the developing sleeve 3 in the direction normal to the surface of the sleeve; and $F\theta$ is the magnetic force on the developing sleeve 3 in the tangential direction. The force F is the resultant force of Fr and $F\theta$.

The magnetic force means force (vector) applied to a magnetic member such as a carrier particle disposed in the magnetic field.

The magnetic force Fr is:

$$Fr \alpha (B^2(r) - B^2(r+\Delta r))/\Delta r$$

wherein $B^2(r) = Br^2(r) + B\theta^2(r)$, and $B^2(r+\Delta r) = Br^2(r+\Delta r) + B\theta^2(r+\Delta r)$.

Therefore, if $$(B^2(r) - B^2(r+\Delta r))/\Delta r$$

is obtained, the relative magnification of the magnetic force Fr can be known. Then, the distribution of the magnetic force Fr and the peak position of the magnetic force Fr can be obtained. If $\Delta r$ is constant, $Fr \alpha B^2(r) - B^2(r+\Delta r)$, and therefore, what is required is to obtain $B^2(r) - B^2(r+\Delta r)$.

Actually, the magnetic flux densities $Br(r)$, $Br(r+\Delta r)$, $B\theta(r)$ and $B\theta(r+\Delta r)$ are measured using a Gauss meter (Bell Corporation), under the condition that r was the radius of the developing sleeve, and $\Delta r$ was 1 mm. Then, the calculation is made to obtain $B^2(r) - B^2(r+\Delta r)$, and on the basis of that, the relative level of the magnetic force Fr was obtained.

Here, $Br(r)$ is magnetic flux density (Gauss) on the developing sleeve surface in the direction normal to the surface; $Br(r+\Delta r)$ is magnetic flux density (Gauss) at a position 1 mm away from the sleeve surface in the direction normal to the sleeve surface; $B\theta(r)$ is magnetic flux density (Gauss) on the sleeve surface in the direction tangential thereto; and $B\theta(r+\Delta r)$ is magnetic flux density (Gauss) at a point 1 mm away from the developing sleeve surface in the direction tangential to the surface.

Figure 3A:
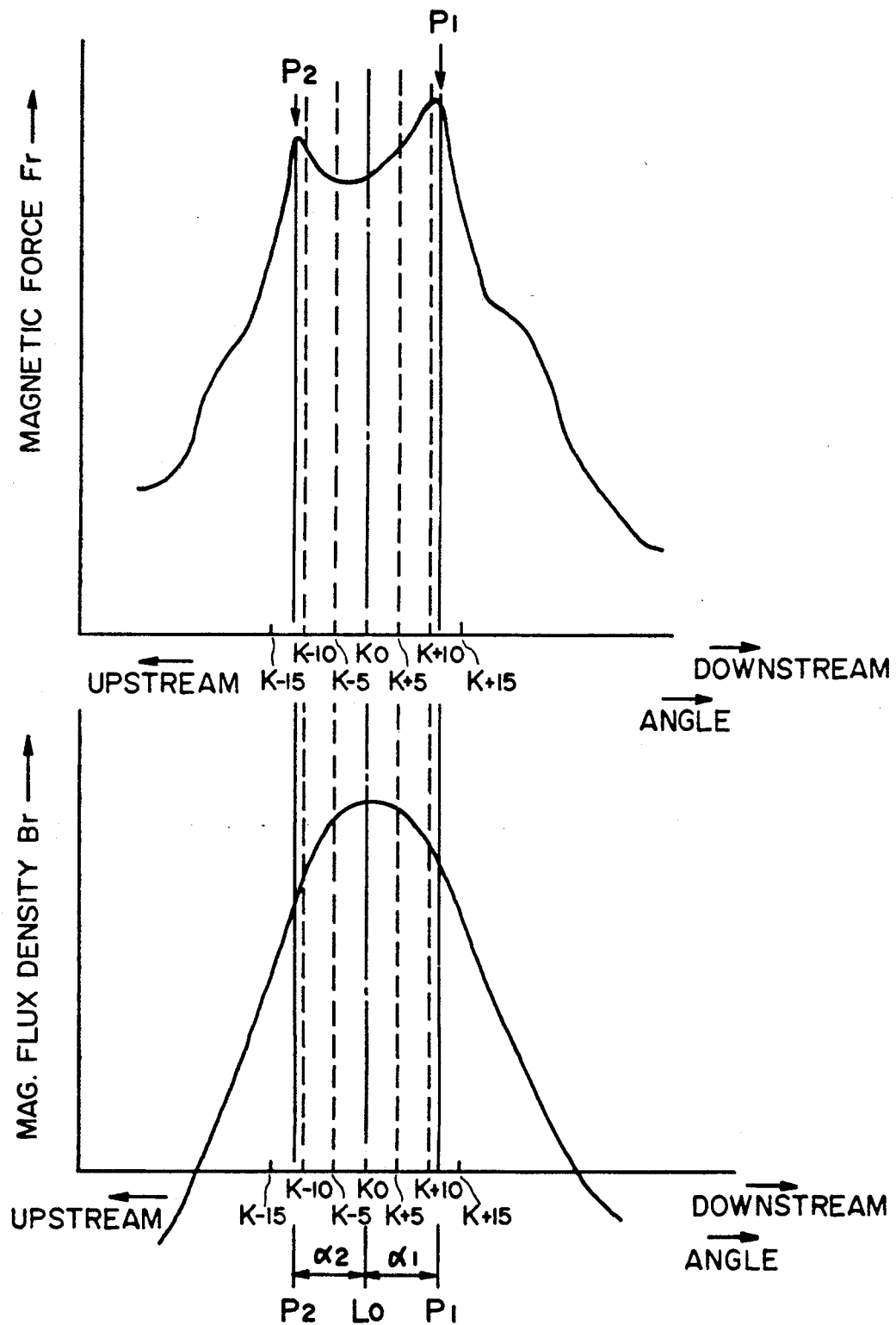
FIGS. 3A and 3B and 7 are graphs showing distribution of magnetic force Fr and a magnetic flux density $\text{B}$ of the developing magnetic pole.
Figure 3B:
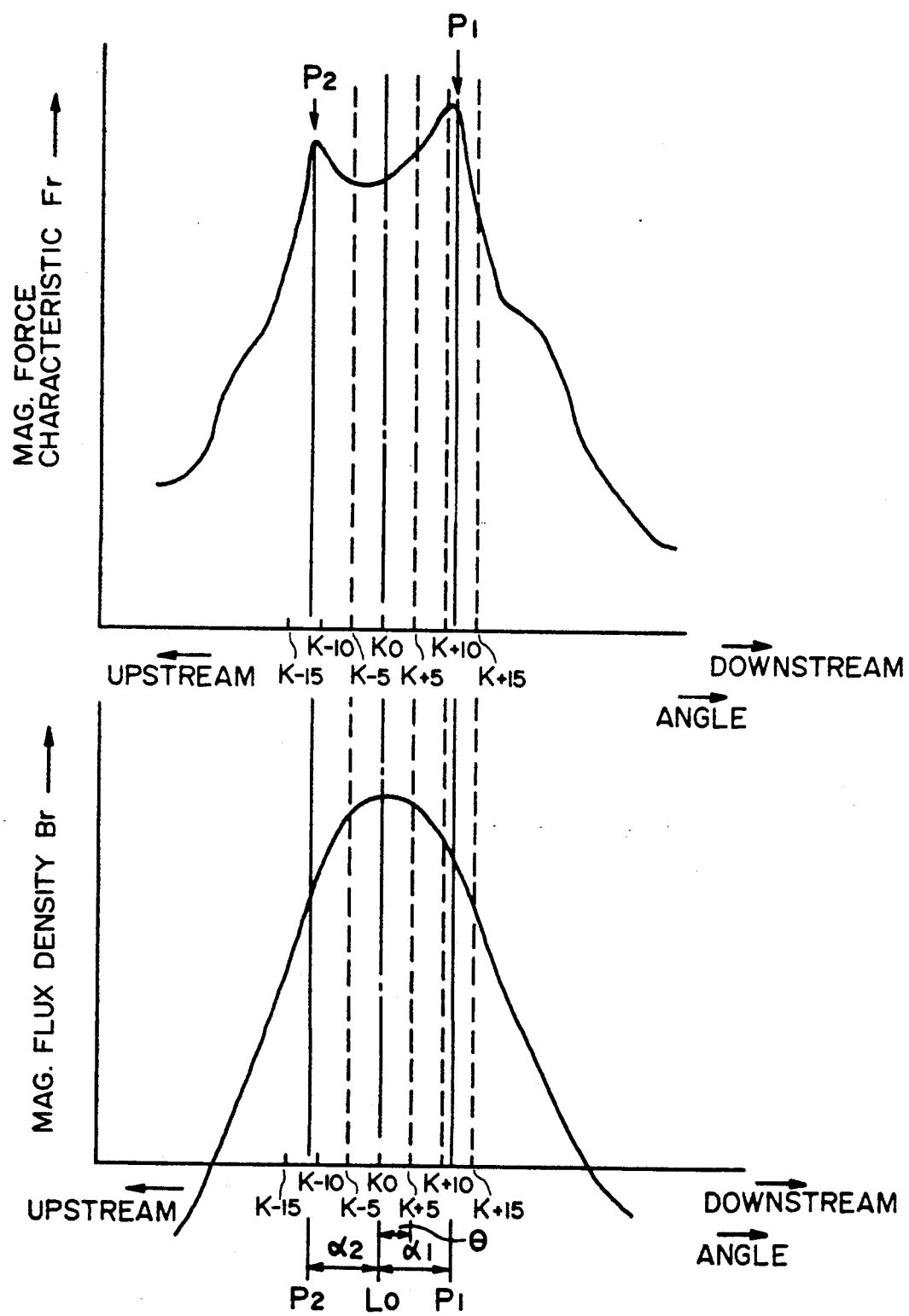

FIGS. 3A and 3B show distribution of the magnetic flux density Br of the developing magnetic pole S1 and the distribution of the magnetic force Fr. The abscissa represents a circumferential position of the developing sleeve expressed by an angle as seen from the center of the sleeve, and the ordinate represents the magnetic force Fr on the developing sleeve or the magnetic flux density of the developing sleeve. In this example, the single developing magnetic pole provides two peaks of the magnetic force Fr. The peak which is larger and at a downstream side with respect to the sleeve rotation direction is designated by "P1", and the lower peak at the upstream side is designated by "P2". In this Figure, "K-15"—"K+15" represent the positions with increment of 5 degrees, and "K-15" is upstream side, and "K+15" is downstream side. The center of the developing magnetic pole where the Br is maximum is designated by "K0".

Angles $\alpha 1$ and $\alpha 2$ are angles formed between peak positions P1 and P2 of the magnetic force Fr on the developing sleeve and the position L0 where the surface of the developing sleeve and the image bearing member are closest to each other. The angles are positive (+) when the peaks P1 and P2 of the magnetic force Fr are upstream of the closest position with respect to the movement direction of the developing sleeve, and it is negative (−) when it is at the downstream side.

Thus, the positions of the peak P1 and P2 of the magnetic force Fr can be represented by the angles $\alpha 1$ and $\alpha 2$.

Here, the consideration is made to the case wherein the center K0 of the developing magnetic pole is disposed at the position L0 ($\theta = 0$ degree). As shown in FIG. 3A, the positions K−5 and K+5 are ±5 degrees away from the position L0, and the positions K−10 and K+10 are ±10 degrees away from the position L0. The angles $\alpha 1$ and $\alpha 2$ indicative of the peak positions P1 and P2 of the magnetic force Fr are in the range between −10—−15 degrees from the position L0, and in the range of +10—+15 degrees from the position L0, respectively.

Where the center K0 of the developing magnetic pole is deviated by +5 degrees ($\theta = +5$ degrees) from the position L0 toward upstream side with respect to the movement direction of the developing sleeve, the closest position L0 between the developing sleeve and the image bearing member, as shown in FIG. 3B, that is, the central position of the developing zone is at the position K+5. Positions K0 and K+10 are ±5 degrees away from the position L0, and the positions K−5 and K+15 are ±10 degrees away from the position L0.

Therefore, the angles $\alpha 1$ and $\alpha 2$ indicative of the peak positions P1 and P2 of the magnetic force Fr are in the range of −5—−10 degrees from the position L0 and in the range of +15—+20 degrees from the position L0.

Where the center K0 of the magnetic pole is deviated by +10 degrees ($\theta = +10$ degrees) from the position L0 toward the upstream side, the angles $\alpha 1$ and $\alpha 2$ indicative of the peak positions P1 and P2 of the magnetic force Fr are in the range of 0—−5 degrees from the position L0 and in the range of +20—+25 degrees from the position L0.

It has been confirmed through experiment that the position or positions of the peak or peaks of the magnetic force Fr have connection with the amount of carrier particles deposited onto the drum, and that the carrier deposition prevention effect is significant where the peak of the magnetic force Fr is within ±8 degrees from the position L0 (the center of the developing zone), particularly when it is within ±5 degrees from the position L0. When the number of the peaks of the magnetic force Fr is plural, the maximum peak (P1) is preferably within the range, since then the effect is significant. The position θ of the center of the developing magnetic pole has connection with the fineness (non-roughness) of a solid (black) image. When the angle θ is 0 degrees, the image is slightly rough when the image is a solid or halftone image. However, when the θ is not less than 3 degrees, that is, when θ ≦ −3 or θ ≧ +3 the image is good without the roughness.

When θ=0, the center of the developing pole is at the closest position between the developing sleeve and the image bearing member, and therefore, the brush of the developer is sparse at a position where the developing electric field is strongest, and therefore, the developing action is most promoted. When the center of the developing pole is deviated from the closest position, the brush of the developer is dense at the closest position. This is considered as being the reason why the roughness of the image has been reduced. It is not necessary that the center position of the developing pole and the peak position of the magnetic force Fr are not necessarily the same. Rather, positively utilizing the deviation between the peak position of the magnetic force Fr and the center of the developing pole, the peak position of the magnetic force Fr may be adjacent the center of the developing zone, by which the carrier deposition onto the drum can be prevented. In addition, by deviating the center of the developing pole from the center of the developing zone, the roughness of the image can be prevented.

When only one developing pole is disposed in or adjacent the developing zone, it is difficult to significantly increase the deviation between the center of the developing pole and the peak position of the magnetic force Fr. In this embodiment, when the center of the developing pole is placed away from the center (position L0) of the developing zone by more than 15 degrees, that is, when θ < −15 degrees, or θ > +15 degrees, the effect of preventing the carrier deposition onto the drum is slightly decreased.

In order to obtain Br distribution and Fr distribution, plural magnet segments may be properly directed and bonded, or a roller may be magnetized in proper pattern, or a magnet roller may be partly cut away.

Figure 4:
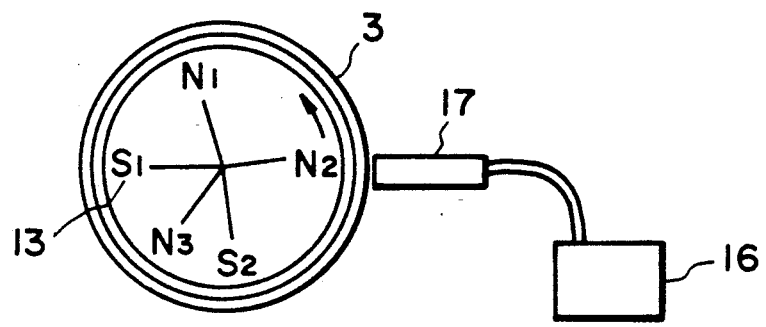
FIGS. 4 and 5 are sectional views of the sleeve and the magnet roller illustrating method of measuring magnetic flux density Br and a magnetic flux density B$\theta$.

The description will be made as to an example of measurement method of the magnetic flux density. FIG. 4 illustrates the measurement method of the magnetic flux density Br in the normal direction at a position on the sleeve 3 or 1 mm away from the sleeve. A Gauss meter, Model 640 (Bell Corporation) is used. The sleeve 3 is fixed horizontally, and the magnet roller 13 in the sleeve 3 is rotatable. An axial probe 17 is fixed with a small clearance from the sleeve 3 in the manner that the center of the sleeve 3 is at the same horizontal level as the center of the probe 17. The probe 17 is connected with a Gauss meter 16. The probe measures the magnetic flux density in the normal direction on the sleeve or 1 mm away from the sleeve. The sleeve 3 and the magnet roller 13 are concentric, so that the clearance between the sleeve 3 and the magnet roller 13 is substantially the same at any circumferential position.

Therefore, by rotating the magnet roller 13, the magnetic flux density Br in the normal direction on the sleeve 3 or 1 mm away from the sleeve can be measured at any circumferential position.

Figure 5:
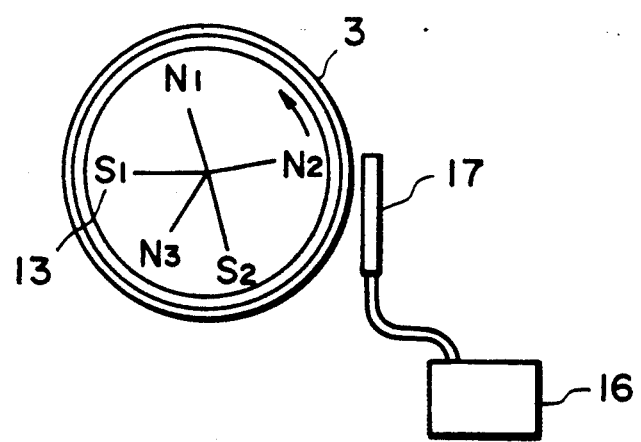

FIG. 5 illustrates measurement of the magnetic flux density Bθ in the tangential direction at the position on the sleeve 3 or 1 mm away from the sleeve 3.

The axial probe 17 is vertically fixed with a small clearance from the sleeve 3 in the manner that the center of the sleeve 3 is substantially at the same level as the measurement center of the probe 18. The probe is connected with a Gauss meter 16 to measure the magnetic flux density in the tangential direction at a position on the sleeve or 1 mm away from the sleeve.

Similarly to FIG. 4, by rotating the magnet roller 13 in the direction of the arrow, the magnetic flux density Bθ in the horizontal direction on the sleeve 3 or at a position 1 mm away from the sleeve can be measured at any circumferential position.

The more detailed examples will be described.

In the embodiment, the dark portion potential of the electrostatic latent image was −650V; the light portion potential thereof was −200V, the alternating voltage applied to the developing sleeve 3 was an AC voltage having a frequency of 2000 Hz and a peak-to-peak voltage of 2000V biased with a DC voltage of −350V.

The electrophotographic photosensitive drum 1 (image bearing member) had an outside diameter of 80 mm; the developing sleeve 3 had an outside diameter of 32 mm; the clearance between the developing sleeve 3 and the regulating blade 4 was 500 microns; the interval between the developing sleeve 3 and the photosensitive drum 1 was 800 microns; and the peripheral circumferential speed of the photosensitive drum 1 was 160 mm/sec.

The used magnet rollers A and B each had two peaks of the magnetic force Fr by one developing magnetic pole, and the used magnet roller C had only one peak of the magnetic force Fr. The deposition of the carrier particles to the drum and the roughness of the developed image were checked when the central position of the developing pole and the peak position of the magnetic force Fr were changed. The results are shown in Table 1.

The magnetic flux densities Br at the center of the developing pole were approximately 1000 Gauss on the surface of the sleeve for all of the rollers A, B and C.

TABLE 1

| | Arrangement | | | Evaluation | | |
| | Magnetic roller | Dev. pole center position θ | Peak position of magnetic force Fr | | Anti-carrier deposition | Non-roughness | Overall evaluation |
| | | | α1 | α2 | | | |
| --- | --- | --- | --- | --- | --- | --- | --- |
| Example 1 | A | +3° | −8° | +10° | G | E | G |
| Example 2 | " | +5 | −6 | +12 | G | E | G |
| Example 3 | " | +7 | −4 | +14 | E | E | E |
| Example 4 | " | +10 | −1 | +17 | E | E | E |
| Example 5 | " | −3 | −14 | +4 | E | E | E |
| Example 6 | " | −5 | −16 | +2 | E | E | E |
| Example 7 | " | −10 | −21 | −3 | E | E | E |
| Comparison 1 | " | 0 | −11 | +7 | G | N | N |
| Comparison 2 | " | +20 | +9 | +27 | N | — | N |
| Comparison 3 | " | −20 | −31 | −13 | N | — | N |

TABLE 1-continued

|  | Magnetic roller | Arrangement | | | Evaluation | | |
|---|---|---|---|---|---|---|---|
|  |  | Dev. pole center position $\theta$ | Peak position of magnetic force Fr | | Anti-carrier deposition | Non-roughness | Overall evaluation |
|  |  |  | $\alpha 1$ | $\alpha 2$ |  |  |  |
| Example 8 | B | +5 | −7 | +16 | G | E | G |
| Example 9 | " | +10 | −2 | +21 | E | E | E |
| Example 10 | " | −5 | −17 | +6 | G | E | G |
| Comparison 4 | " | 0 | −12 | +11 | N | N | N |
| Example 11 | C | +5 | −3 |  | E | E | E |
| Example 12 | " | +10 | +2 |  | E | E | E |
| Example 13 | " | +15 | +7 |  | G | E | G |
| Comparison 5 | " | 0 | −8 |  | G | N | N |
| Comparison 6 | " | −5 | −13 |  | N | — | N |
| Comparison 7 | " | +20 | +12 |  | N | — | N |

E: Excellent
G: Good
N: No good

As will be understood from Table 1, the carrier deposition to the drum hardly occurs if the peak position $\alpha 1$ or $\alpha 2$ of the magnetic force Fr is within $0\pm 8$ degrees from the position L0, and particularly if it is within $0\pm 5$ degrees from the position L0, the prevention of the carrier deposition is extremely good. On the other hand, when it is more than 8 degrees away from the position L0, the carrier deposition occurs.

When the center of the developing pole is at the developing zone center L0, that is, when $\theta = 0$ degrees, the solid (black) image, particularly the half tone image had slight roughness. When the center of the magnetic pole L0 is not less than 3 degrees away from the developing zone center, that is, when $|\theta| \geq 3$, the image was good without the roughness.

As a result, the overall evaluation from the standpoint of the prevention of the carrier deposition and the prevention of the roughness, is such that the developing pole position is not less than 3 degrees away from the developing zone center position L0, that is, $|\theta| > 3$ degrees; the peak position $\alpha 1$ or $\alpha 2$ of the magnetic force Fr is within $0\pm 8$ degrees (further preferably $0\pm 5$ degrees). By positively utilizing the deviation between the developing pole center position and the peak position of the magnetic force Fr, the peak position of the magnetic force Fr may be placed adjacent the developing zone center (more particularly, $|\alpha 1|$ or $|\alpha 2|$ is not more than 8 degrees further particularly 5 degrees), by which the carrier particles are prevented from being deposited on the drum; and in addition, by deviating the central position of the developing pole from the developing zone center (more particularly, $|\theta| > 3$ degrees), the production of roughness of the image ca be prevented. In other words, the carrier deposition prevention and the image roughness prevention are both accomplished.

Although not shown in the Table, it has been confirmed that the roughness in the solid image is slightly lower when the developing pole center position is disposed upstream of the position L0 with respect to the movement direction of the developing sleeve than when it is disposed downstream thereof (that is, the positive $\theta$ is better than the negative $\theta$). Inversely, the sharpness of the image is slightly better when it is disposed downstream than when it is disposed upstream.

The reason for the above is not completely understood. However, if the consideration is made to the magnetic force $F\theta$ in the tangential direction on the developing sleeve, the tangential magnetic force $F\theta$ is generally considered as acting toward the center of the developing pole adjacent the center of the developing pole (although there is a position where it is opposite, strictly speaking), and therefore, the developer in the developing zone receives force by which it is pulled back to the upstream center of the developing pole, by which the amount of the developer is large in the developing zone, and therefore, the brush of the developer is more dense to be advantageous in the fineness of the solid image.

When, on the contrary, the center of the developing pole is disposed downstream of the position L0, the developer in the developing zone receives force s that it is advanced to the downstream center of the developing pole, and therefore, the amount of the developer in the developing zone becomes smaller than when the developing pole center is disposed at the upstream side, and as a result, the developer brush becomes sparse, so that the roughness of the solid image is slightly increased.

It is not completely clarified whether the above advantageously contributes to the improvement in the sharpness of the image.

Figure 6:
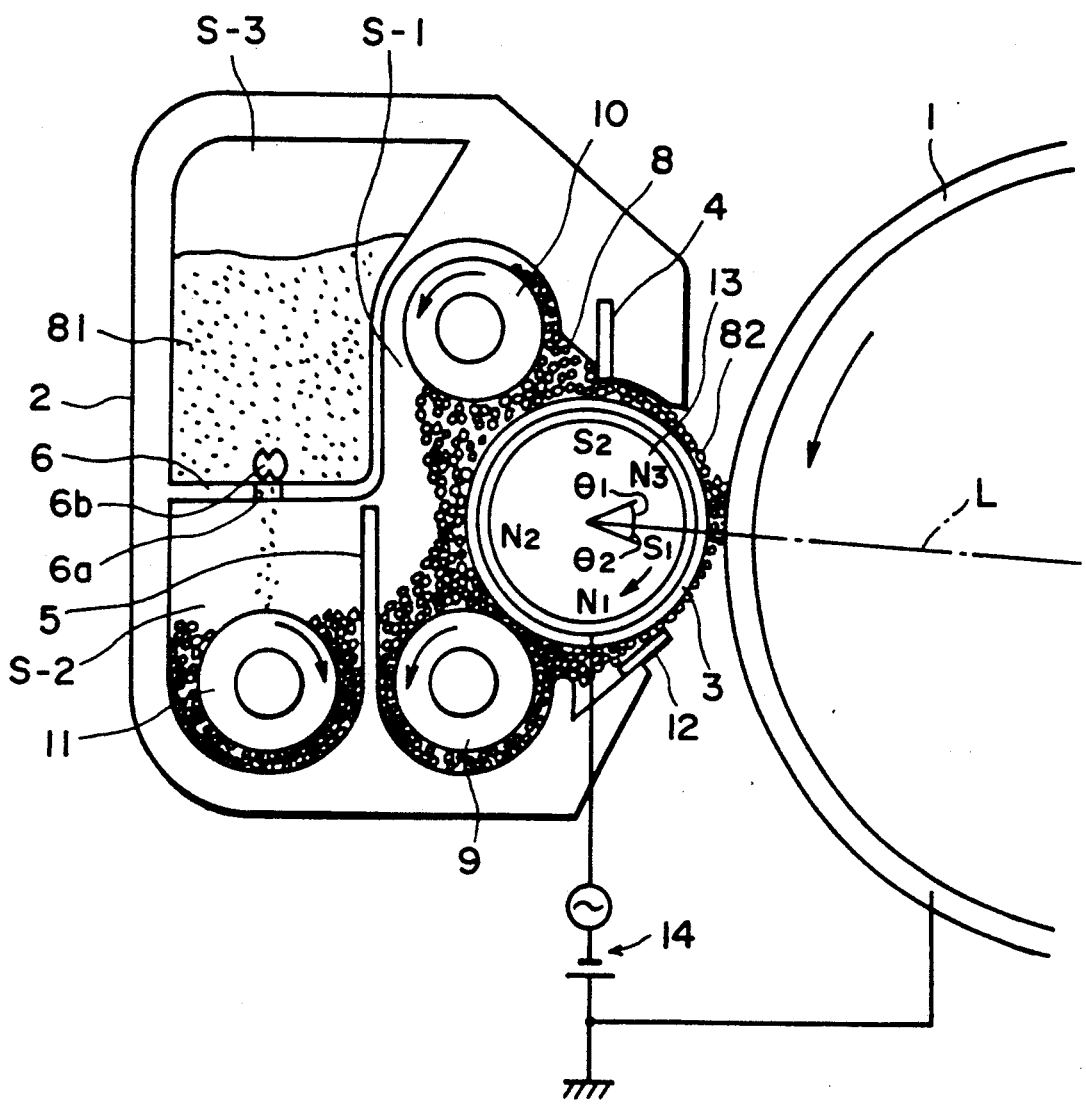
FIG. 6 is a sectional view of a developing apparatus according to another embodiment of the present invention, used with a copying machine having a drum type photosensitive member.

FIG. 6 shows an apparatus according to another embodiment of the present invention, wherein a copying apparatus having an electrophotographic photosensitive drum is shown.

This embodiment is different only in the arrangement of the magnetic poles of the developing roller 31. Therefore, the detailed description of the other parts are omitted for simplicity by assigning the same reference numerals to the corresponding elements.

In this embodiment, similarly to U.S. Pat. No. 4,653,427, a position between a center of a first developing magnetic pole N3 which is at the upstream side and a center of a second developing magnetic pole S1 which is at the downstream side with respect to the movement direction of the developing sleeve, is faced to the image bearing member, to effect so-called between-poles development.

In the U.S. Pat. No. 4,653,427, so-called non-contact development is carried out wherein the thickness of the developer layer in the developing zone is smaller than the minimum clearance between the sleeve and the drum. However, in this embodiment, so-called contact development is carried out wherein the layer of the developer is contacted to the drum in the developing zone.

In FIG. 6, angles $\theta 1$ and $\theta 2$ are angles formed between a line L connecting a rotational center of the developing sleeve and a rotational center of the image bearing member and a line connecting the center of a first developing magnetic pole N3 and the rotational center of the developing sleeve 3, and between the line L and a line connecting the center of a second developing magnetic pole S1 and the center of the developing sleeve 3, respectively. The angles are positive (+) when the center of the magnetic pole i upstream of the line L with respect to the movement detection of the developing sleeve, and it is negative (−) when it is downstream thereof. In this embodiment, the angle $\theta 1$ is positive, and the angle $\theta 2$ is negative.

Figure 7:
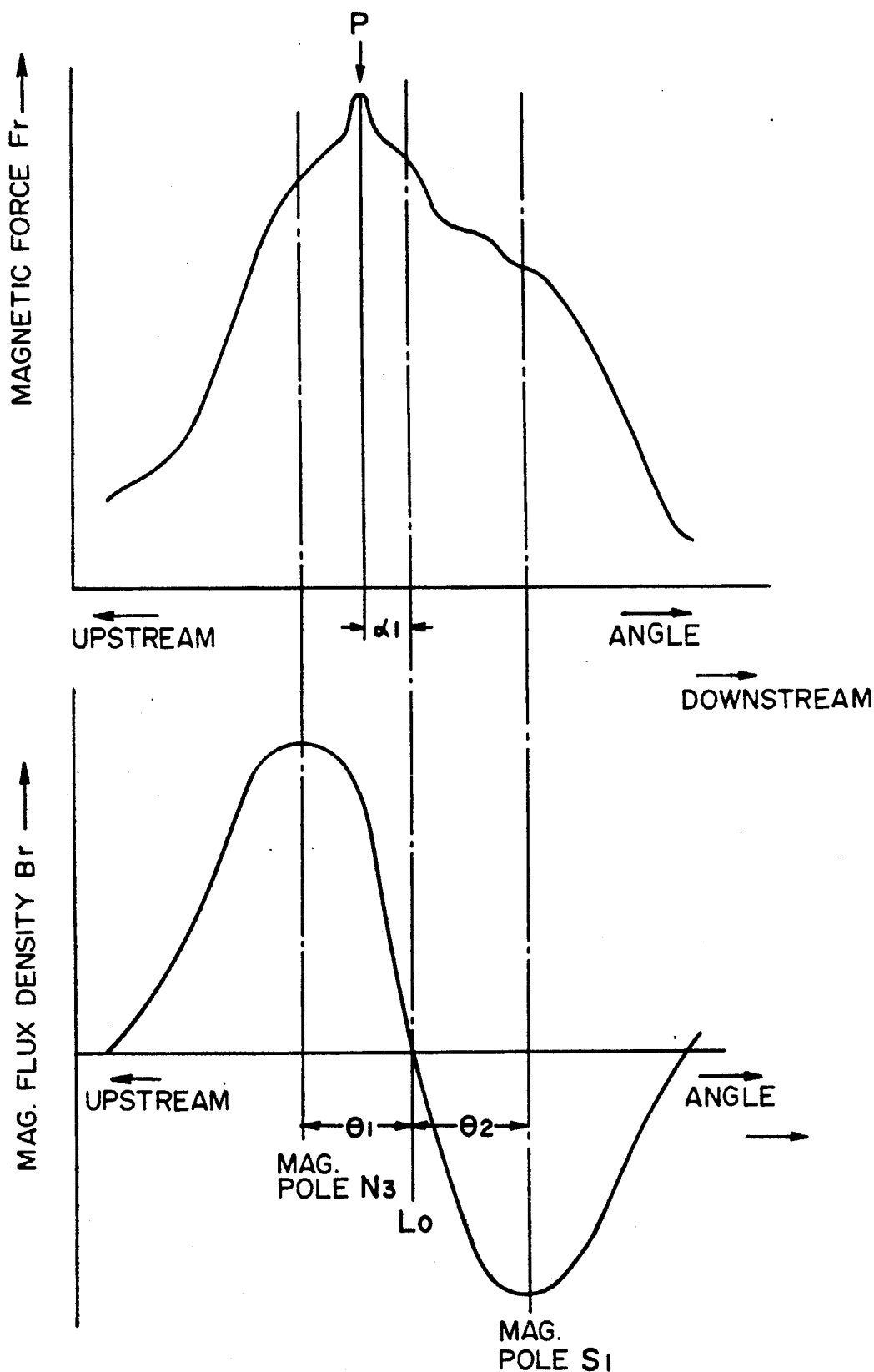

FIG. 7 shows a distribution of the magnetic flux density Br of each of the first and second developing magnetic poles and a distribution of the magnetic force Fr as an example. The abscissa represents by an angle a circumferential position of the developing sleeve, and the ordinate represents the magnetic force Fr on the developing sleeve or the magnetic flux density on the developing sleeve.

A magnet roller D was used which had two developing poles as shown in FIG. 7 and one peak P of the magnetic force Fr. The magnetic flux density Br of the center of the first developing pole N3 which is at the upstream side was 850 Gauss on the surface of the sleeve, and the magnetic flux density Br of the center of the second developing pole S1 at the downstream side was 800 Gauss on the sleeve. The angle formed between the center of the first developing pole N3 and the center of the second developing pole S1 ($\theta 1 + \theta 2$) was 46 degrees. The carrier particle deposition to the drum and the roughness of the image were checked when the peak position of the magnetic force FR was changed by changing the position of the developing poles.

The results are shown in Table 2.

TABLE 2

| | Magnetic roller | Arrangement | | | Evaluation | | |
|---|---|---|---|---|---|---|---|
| | | Dev. pole center position $\theta$ | Peak position of magnetic force Fr | | Anti-carrier deposition | Non-roughness | Overall evaluation |
| | | | $\alpha 1$ | $\alpha 2$ | | | |
| Example 14 | D | 25° | −21° | −7° | G | E | G |
| Example 15 | " | 20 | −26 | −2 | E | E | E |
| Example 16 | " | 15 | −31 | +3 | E | E | E |
| Example 17 | " | 10 | −36 | +8 | G | E | G |
| Comparison 8 | " | 5 | −41 | +13 | N | — | N |
| Comparison 9 | " | 30 | −16 | −12 | N | — | N |

E: Excellent
G: Good
N: No good

As will be understood from Table 2, when the peak position $\alpha 1$ of the magnetic force Fr is within 0±8 degrees from the position L0, the carrier particles were hardly deposited onto the drum, particularly, if it is within 0±5 degrees, the carrier deposition prevention effect is extremely good. The Table 2 shows the results of the so-called between-poles development using the first developing pole N3 and the second developing pole S3, wherein both of the positions $\theta 1$ and $\theta 2$ of the first and second developing poles are not less than 10 degrees away from the developing zone center, and the image was good without roughness.

The present invention is not limited to the developing apparatus for an electrophotographic apparatus, but is applicable to a developing apparatus for developing an electrostatic latent image formed with modulated flow of ions or the like on an insulative member.

While the invention has been described with reference to the structures disclosed herein, it is not confined to the details set forth and this application is intended to cover such modifications or changes as may come within the purposes of the improvements or the scope of the following claims.

What is claimed is:

1. A developing apparatus for developing an electrostatic latent image formed on an image bearing member; comprising:
    a developer chamber containing a developer comprising non-magnetic toner particles and magnetic carrier particles;
    a rotatable cylindrical developer carrying member, faced to the image bearing member, for carrying the developer supplied thereto in the developer chamber to supply it to the image bearing member;
    a magnet stationarily disposed in said developer carrying member to form a magnetic brush of the developer contactable to said image bearing member, wherein a position of maximum magnetic flux density in a direction normal to a surface of the developer carrying member provided by a developing magnetic pole of said magnet is not less than 3 degrees away from a position where said developer carrying member is closest to the image bearing member, and wherein a position of a peak of magnetic force in a direction normal to the surface of said developer carrying member provided by the developing magnetic pole is within 8 degrees from the closest position.

2. An apparatus according to claim 1, wherein said developer carrying member carries a developer comprising non-magnetic toner particles having a volume average particle size of not more than 10 microns, and magnetic carrier particles having a weight average particle size of not more than 80 microns.

3. An apparatus according to claim 2, wherein the peak position of the magnetic force is within 5 degrees from the closest position.

4. An apparatus according to claim 2, wherein the maximum magnetic flux density position is not less than 3 degrees away and not more than 15 degrees away from the closest position.

5. An apparatus according to claim 3, wherein the maximum magnetic flux density position is not less than 3 degrees away and not more than 15 degrees away from the closest position.

6. An apparatus according to any one of claims 1-5, further comprising a voltage source for applying an alternating bias voltage to said developer carrying member.

7. An apparatus according to claim 6, further comprising a regulating member for regulating a layer of the developer carried on said developer carrying member to a position where the developer is supplied to the image bearing member, the regulating member being away from said developer carrying member with a clearance of 50–900 microns.

* * * * *

UNITED STATES PATENT AND TRADEMARK OFFICE
CERTIFICATE OF CORRECTION

PATENT NO. : 5,070,812
DATED : December 10, 1991
INVENTOR(S) : MASAAKI YAMAJI

It is certified that error appears in the above-identified patent and that said Letters Patent is hereby corrected as shown below:

COLUMN 1

Line 24, "pole" should read --poles--.
Line 29, "in" should read --is--.
Line 45, "if" should read --is--.
Line 47, "half tone" should read --halftone--.

COLUMN 3

Line 31, "has" should read --have--.
Line 34, "example" should read --example,--.
Line 35, "Coalter" should read --Coulter-- (both occurrences).
Line 56, "30-8 microns," should read --30-80 microns,--.

COLUMN 6

Line 22, "it is" should read --they are--.
Line 24, "peak" should read --peaks--.

COLUMN 9

Line 28, "half tone" should read --halftone--.
Line 37, "$|\theta|>3$" should read --$|\theta|\geqq3$--.
Line 50, "ca" should read --can--.

COLUMN 10

Line 29, "s" should read --so--.

UNITED STATES PATENT AND TRADEMARK OFFICE
CERTIFICATE OF CORRECTION

PATENT NO. : 5,070,812

DATED : December 10, 1991

INVENTOR(S) : MASAAKI YAMAJI

It is certified that error appears in the above-identified patent and that said Letters Patent is hereby corrected as shown below:

COLUMN 11

Line 5, "i" should read --is--.
    Line 6, "detection" should read --direction--.
    Line 30, "force FR" should read --force Fr--.

Signed and Sealed this

Seventeenth Day of August, 1993

Attest:

BRUCE LEHMAN

Attesting Officer     Commissioner of Patents and Trademarks